June 8, 1926.
F. V. WINTERS
VACUUM PRESERVING DEVICE
Filed Sept. 29, 1923    2 Sheets-Sheet 1
1,588,079
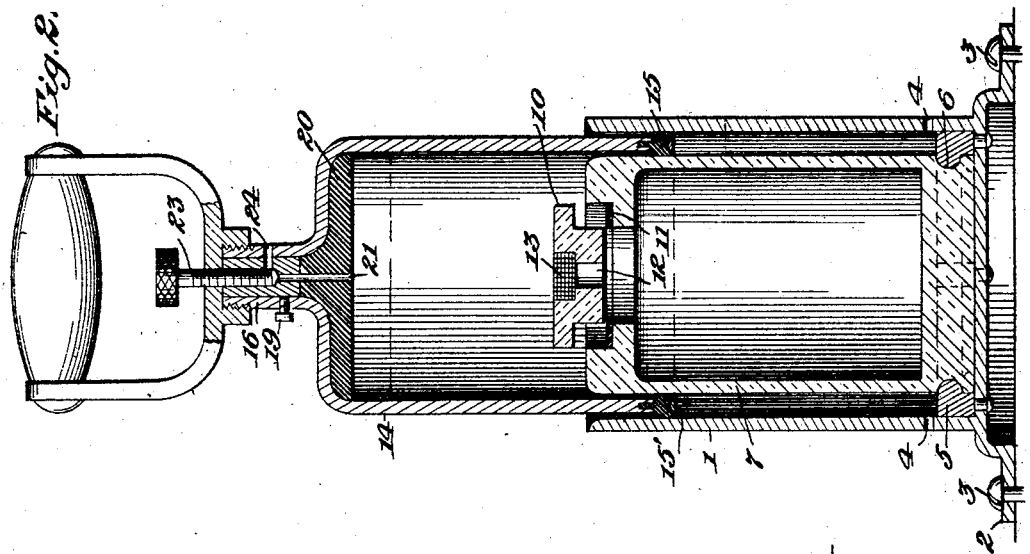
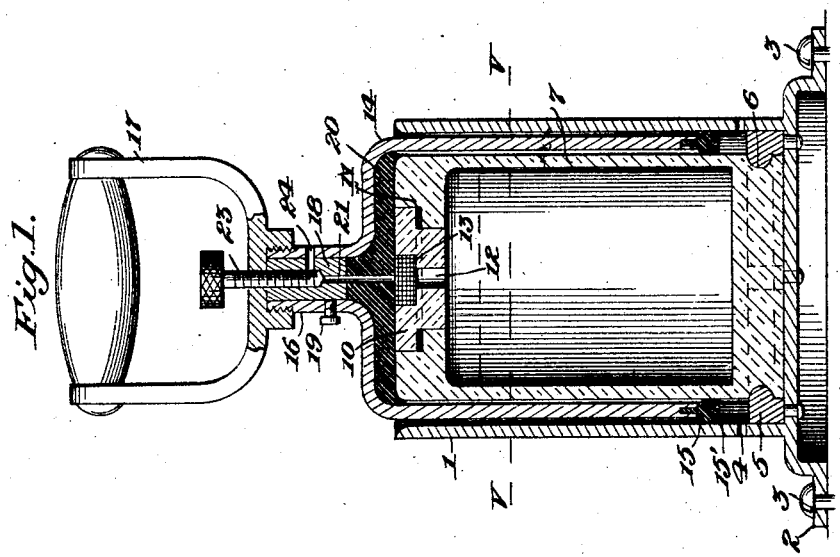
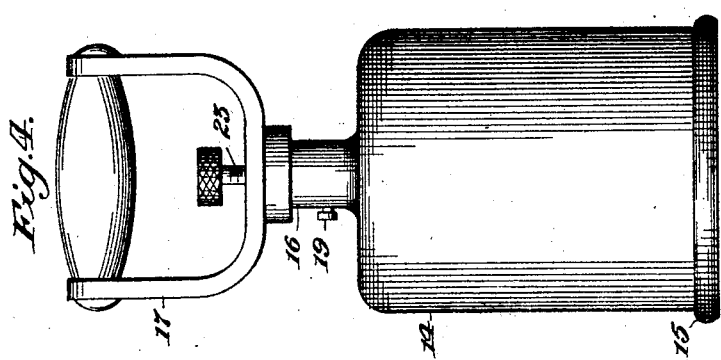
Inventor:
Frederick V. Winters

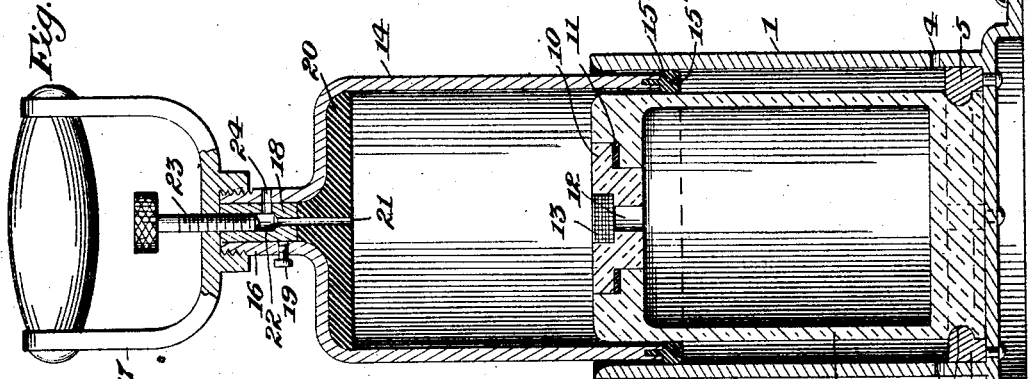
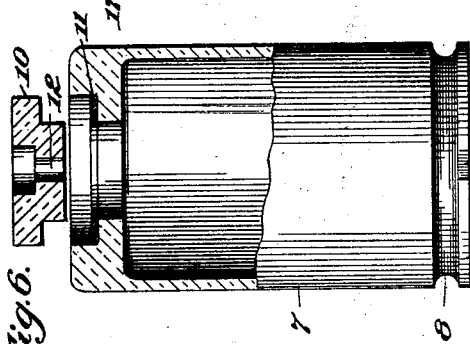
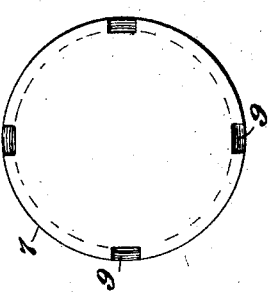
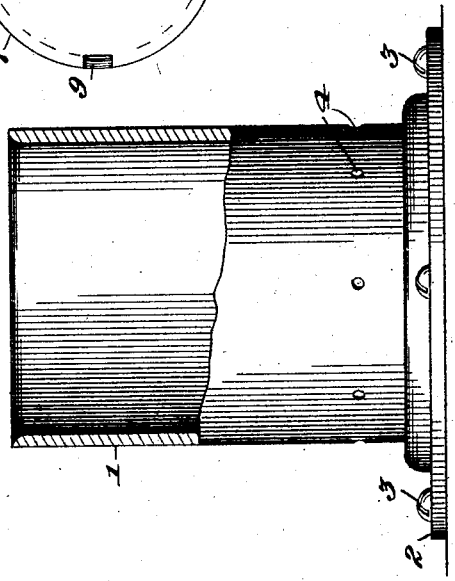
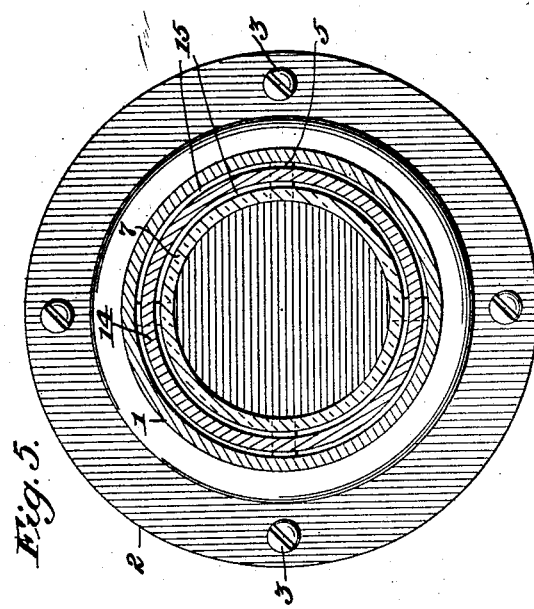

Patented June 8, 1926.                                                       1,588,079

UNITED STATES PATENT OFFICE.

FREDERICK V. WINTERS, OF NEW YORK, N. Y.

VACUUM PRESERVING DEVICE.

Application filed September 29, 1923. Serial No. 665,631.

This invention relates to vacuum preserving devices, and has for its object to provide improved and simplified means for producing a partial vacuum in a jar of preserves in an economical and effective manner.

Another object is to provide a jar for containing the preserves, said jar having smooth exterior walls and adapted to be detachably secured within a socket member having smooth interior walls between which and the jar a cup-shaped piston is adapted to be reciprocated for drawing out the air from the jar after which atmospheric pressure may be admitted to the piston for automatically seating a suitable cover on the jar to maintain the partial vacuum created therein. Said jar and the cover therefor are preferably made of glass, and the cover may be formed with a perforation normally closed by a sealing compound which can be easily punctured for admitting air to the jar when the same is to be opened. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:

Figure 1 is a central vertical section of a vacuum preserving device constructed substantially in accordance with this invention and showing a jar secured concentrically within a socket member, and a cup-shaped piston at the end of its inward stroke between said jar and socket member, the air inlet valve in the piston being closed as when said piston is to be raised for extracting the air from said jar.

Figure 2 is a similar view of the apparatus showing the piston raised as when extracting the air from the jar to form a partial vacuum therein.

Figure 3 is a view similar to Figure 2 except that the air inlet valve in the piston is open, the cover of the jar closed, and the gasket around the lower edge of the piston is collapsed owing to the entrance of air from the atmosphere into said piston.

Figure 4 is a detailed elevation of the piston member.

Figure 5 is a section on the line V—V of Figure 1.

Figure 6 is a broken elevation of the jar with the cover therefor removed.

Figure 7 is a bottom plan view of the jar, and

Figure 8 is a broken elevation of the socket member.

The socket member 1 has a base 2 which may be secured by screws 3 or other suitable means to a table, bench, or other suitable fixture, not shown. Said socket member has smooth, cylindrical interior walls extending vertically up from the base 2, and a series of perforations 4 are formed through said walls a short distance above the base. Secured to the base at the bottom of the socket are a plurality of spaced locking lugs 5 having rounded inward extensions 6 for detachably retaining a preserving jar 7 concentrically in the socket member, as illustrated in Figures 1, 2, 3 and 5.

Said jar 7 is preferably made of glass and has smooth, cylindrical, external walls which are spaced concentrically from the interior walls of the socket member when said jar is arranged in the latter. An annular groove 8 is formed in the jar 7 near its bottom to fit the rounded projection 6 on the locking lugs 5 in the socket member, and notches 9 lead from the bottom of the jar into said groove 8 at intervals corresponding to the location of said locking lugs so that said lugs may be introduced into the groove through said notches when the jar is lowered into the socket member. After said jar has been dropped down onto the base of the socket member and the rounded extensions 6 of the locking lugs 5 have passed up through the notches 9 into the groove 8, the jar is given a partial turn to bring said notches out of alinement with said inward projections on the locking lugs, thereby detachably fastening the jar in concentric position in the socket member.

The top of the jar is made substantially flat and is provided with a stepped central opening in which a correspondingly shaped cover 10, also preferably made of glass, may be fitted, a gasket or washer 11 being interposed between the step portions of said opening and cover for preserving an air tight joint between them. Said cover 10 has a central stepped perforation 12, and the larger upper portion thereof is filled with a sealing material 13 which is flush with the top of the cover and jar. Said sealing material is adapted to be punctured for admitting air to the jar when the cover is to be removed.

A cylindrical cup-shaped piston 14 is open at the bottom and has cylindrical walls adapted to be inserted between the jar 7 and socket member 1 when said parts are assembled, as shown in Figures 1, 2, 3 and 5. A gasket or packing ring 15 is suitably secured around the lower end of the piston and is preferably provided with a V-shaped groove 15' in its bottom face to facilitate the expansion and contraction thereof when the device is in use. At the upper end of the piston there is a contracted neck portion 16 to which is secured a handle 17 or other suitable operating means. A plug 18 is fitted tightly in the neck 16 being retained therein by a set screw 19 or other suitable means. A rubber buffer 20 is secured in the upper end of the piston 14 to engage the top of the jar when said piston is at the lower end of its stroke, as shown in Figure 1. Said buffer extends up to the plug 18, and a passage 21 extends through said buffer and plug so as to open on a valve seat 22 in the latter. A needle valve 23 is screwed into the plug through the handle member 17 for engaging said valve seat 22 to cut off the intake of air into the piston through the passage 21, see Figures 1 and 2. When said valve 23 is raised, as shown in Figure 3, air is admitted to the piston via port 24 extending to the valve seat through the plug 18 and neck 16 of the piston, and through the passage 21.

In operation, the jar 7, containing fruit or vegetables to be preserved, is inserted in the socket member 1 and fastened therein by means of locking lugs 5 already explained. The cover 10 is placed on the jar before or after the latter is adjusted in the socket member and prior to the introduction of the piston 14 into the space between said jar and socket member. As said piston is pushed down to the position indicated in Figure 1, the air below the gasket or packing ring 15 is forced out through the perforations 4 in the socket member, and the air in said piston above the top of the jar escapes through the passage 21 and port 24, the valve 23 being open. When the piston is fully depressed, the valve 23 is closed, as shown in Figure 1, and the piston is then raised substantially to the position illustrated in Figure 2. During this raising of the piston air enters below the gasket or packing ring 15 through the perforations 4, but as no air can enter the piston above said packing ring, the latter is expanded to fill the space between the walls of the jar 7 and socket member 1, as clearly shown in Figure 2.

The upward movement of the piston with its valve 23 closed, causes the cover 10 of the jar to rise and the air in said jar to be drawn out, thus forming a partial vacuum within the jar for preserving the contents thereof. After sufficient air has been drawn out of the jar in this way, the valve 23 is opened to admit air to the piston through the port 23 and passage 21 whereupon the cover 10 of the jar is immediately seated, as shown in Figure 3, so as to maintain the partial vacuum which has been thus formed in the jar. The atmospheric pressure on the top of the jar will press said cover firmly on its seat upon the gasket 11, and in order to remove said cover it will be necessary to puncture the sealing material 13 and thus admit air into the jar. As soon as air is admitted into the interior of the piston, the gasket or packing ring 15 contracts to normal position, so that said piston may be easily removed to permit the jar to be taken out of the socket member, and another jar placed therein for having the air withdrawn therefrom in the same manner as already described.

Changes may be made in the details of construction herein shown, and described without departing from this invention. For instance, the piston 14 may be reciprocated by any other suitable means as well as hand power, and a plurality of the vacuum preserving devices may be arranged adjacent one another and all of them operated by the same means.

It will be noted that, as shown in Figure 1, the buffer fits closely down over the top of the jar and its cover when the piston is at the lower end of its stroke, so that substantially all the air is expelled from between said buffer and the top of the jar before said piston is raised for extracting the air from the interior of the jar. The top of the jar is preferably made flat, as shown, and the cover, when closed, is preferably flush with said jar top, making a smooth, even surface against which the buffer presses when the piston is pushed all the way down. In case there should be any unevenness in the surfaces of the top of the jar and cover, the elasticity of the buffer will permit it to conform thereto and accomplish the desired purpose of excluding substantially all of the air from between said parts. If the irregularities in the top of the jar should be too great for the buffer to conform satisfactorily to them, the contour of the lower face of said buffer may be changed or modified as may be required.

I claim:

1. The combination with a socket member adapted to removably hold a jar and its cover concentrically therein, of means for detachably locking said jar in the socket member, a cup-shaped piston to be reciprocated between the jar and socket member for extracting air from said jar, a packing ring carried by the lower edge of the piston for making an air tight connection between the jar and socket member, means for admitting air to the socket member below the piston, and means for admitting air to the piston for automatically seating the cover on the jar after the air has been extracted therefrom.

2. The combination with a socket member adapted to removably hold a jar and its cover concentrically therein, of means for detachably locking said jar in the socket member, a cup-shaped piston to be reciprocated between the jar and socket member for extracting air from said jar, a packing ring carried by the lower edge of the piston for making an air tight connection between the jar and socket member, said packing ring having an annular V-shaped groove in its bottom face, means for admitting air to the socket member below the piston, and means for admitting air to the piston for automatically seating the cover on the jar after the air has been extracted therefrom.

3. The combination with a socket member adapted to removably hold a jar and its cover concentrically therein, said jar having an annular groove and spaced notches leading to said groove, of locking lugs secured in the socket member to engage said groove in the jar through said notches for detachably fastening said jar in the socket member, a cup-shaped piston to be reciprocated between the jar and socket member for extracting air from the jar, a packing ring carried by the lower end of the piston for making an air tight joint between the jar and socket member, and means for admitting air to the piston for automatically seating the cover on the jar after the air has been extracted therefrom.

4. The combination with a socket member adapted to removably hold a jar and its cover concentrically therein, of a piston to be reciprocated between the jar and socket member for extracting air from the jar, a packing ring carried by the lower end of the piston for making an air tight joint between the jar and socket member, a buffer in the upper end of the piston to engage the top of the jar and its cover when said piston is at the end of its inward stroke, there being an air inlet passage leading through said buffer, and a valve for controlling said passage, whereby the inlet of air through the piston may be cut off while the air is being extracted from the jar and the air may be admitted to said piston for automatically seating the cover on the jar after the air has been extracted therefrom.

5. The combination with a socket member adapted to removably hold a jar and its cover therein, of a cup-shaped piston to fit over and around said jar, a gasket carried by the lower end of said piston and fitting snugly around the exterior wall of the jar, a buffer of resilient material in the upper end of said piston to conform substantially to the contour of the top of the jar and cover for excluding air from between them when said piston is at the end of its downward stroke, means for reciprocating said piston for extracting air from the jar, and means for admitting air to the piston for automatically seating the cover on the jar after the air has been withdrawn therefrom.

In testimony whereof I have signed my name to this specification.

FREDERICK V. WINTERS.